United States Patent
Lee

(10) Patent No.: US 11,715,410 B2
(45) Date of Patent: Aug. 1, 2023

(54) DISPLAY APPARATUS AND CONTROL METHOD THEREOF

(71) Applicant: SAMSUNG ELECTRONICS CO., LTD., Suwon-si (KR)

(72) Inventor: Minhoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/155,617

(22) Filed: Jan. 22, 2021

(65) Prior Publication Data
US 2021/0343228 A1 Nov. 4, 2021

(30) Foreign Application Priority Data

Apr. 29, 2020 (KR) .................. 10-2020-0052860

(51) Int. Cl.
*G09G 3/20* (2006.01)
*G06T 3/40* (2006.01)
(Continued)

(52) U.S. Cl.
CPC ............. *G09G 3/2096* (2013.01); *G06T 3/40* (2013.01); *G09G 3/20* (2013.01); *G09G 3/2022* (2013.01);
(Continued)

(58) Field of Classification Search
CPC ......... G09G 3/2096; G09G 2300/0452; G09G 2310/0275; G09G 2340/0414; G09G 2340/0421; G09G 2310/0205; G09G 2340/0407; G09G 2340/0435; G09G 3/3685; G09G 2340/04; G09G 3/20; G09G 3/2022; G09G 3/2074; G06T 3/40; H04N 21/2662
See application file for complete search history.

(56) References Cited

U.S. PATENT DOCUMENTS 8,107,007 B2    1/2012  Ogino et al.
9,848,248 B2   12/2017  Chung et al.
(Continued)

FOREIGN PATENT DOCUMENTS

JP          5174329      4/2013
JP       2014-236241    12/2014
(Continued)

OTHER PUBLICATIONS

International Search Report and Written Opinion dated May 11, 2021 in corresponding International Application No. PCT/KR2021/001288.

(Continued)

*Primary Examiner* — Douglas M Wilson
(74) *Attorney, Agent, or Firm* — Nixon & Vanderhye, P.C.

(57) ABSTRACT

A display apparatus is disclosed. The display apparatus includes a display panel configured to drive a frame of a first resolution at a first frame rate, a communication interface comprising circuitry configured to receive content, and a processor configured to, based on a frame rate of the received content being greater than the first frame rate, adjust the received content to a second resolution, and to control the display panel to display a content of the second resolution at a second frame rate, the second frame rate being greater than the first frame rate.

18 Claims, 19 Drawing Sheets

(51) Int. Cl.
*G09G 3/36* (2006.01)
*H04N 21/2662* (2011.01)

(52) U.S. Cl.
CPC ......... *G09G 3/2074* (2013.01); *G09G 3/3685* (2013.01); *G09G 2300/0452* (2013.01); *G09G 2310/0205* (2013.01); *G09G 2310/0275* (2013.01); *G09G 2340/04* (2013.01); *G09G 2340/0407* (2013.01); *G09G 2340/0414* (2013.01); *G09G 2340/0421* (2013.01); *G09G 2340/0435* (2013.01); *H04N 21/2662* (2013.01)

(56) References Cited

U.S. PATENT DOCUMENTS

| | | | |
|---|---|---|---|
| 10,529,272 | B2 | 1/2020 | Kim et al. |
| 10,818,270 | B2 | 10/2020 | Bae et al. |
| 11,004,374 | B2 | 5/2021 | Kurokawa et al. |
| 2007/0273787 | A1 | 11/2007 | Ogino et al. |
| 2009/0140976 | A1 | 6/2009 | Bae et al. |
| 2010/0033630 | A1* | 2/2010 | Liang .......... H04N 7/0115 375/E7.076 |
| 2010/0295837 | A1 | 11/2010 | Yoshinaga et al. |
| 2016/0180789 | A1 | 6/2016 | Hur et al. |
| 2018/0006762 | A1* | 1/2018 | Yang .............. G09G 5/005 |
| 2018/0040301 | A1 | 2/2018 | Bae et al. |
| 2018/0152664 | A1 | 5/2018 | Urabe |
| 2018/0158424 | A1* | 6/2018 | Okamoto ......... G09G 5/008 |
| 2019/0043413 | A1 | 2/2019 | Kim et al. |
| 2019/0043421 | A1* | 2/2019 | Yang ............. G09G 3/3291 |
| 2020/0105176 | A1 | 4/2020 | Kurokawa et al. |
| 2020/0258463 | A1* | 8/2020 | Kim .............. G09G 3/3677 |
| 2021/0043169 | A1 | 2/2021 | Bae et al. |
| 2021/0158735 | A1* | 5/2021 | Hu ............... G09G 3/3611 |

FOREIGN PATENT DOCUMENTS

| | | |
|---|---|---|
| KR | 10-2008-0048655 | 6/2008 |
| KR | 10-2009-0056047 | 6/2009 |
| KR | 10-1211343 | 12/2012 |
| KR | 10-1351046 | 1/2014 |
| KR | 10-2015-0127415 | 11/2015 |
| KR | 10-2018-0015038 | 2/2018 |
| KR | 10-2020-0002908 | 1/2020 |
| KR | 10-2289716 | 8/2021 |

OTHER PUBLICATIONS

Extended European Search Report and Written Opinion dated Jul. 6, 2021 in European Application No. 21152541.5.

Secret of lowering price of D600 series, uploaded on Apr. 18, 2011 & modified on Apr. 19, 2011, 16 pages [http://it.chosun.com/m/svc/article.html?contid=2011041885031], with English-language translation.

Communication pursuant to Article 94(3) EPC dated Dec. 20, 2022 in European Patent Application No. 21152541.5.

* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2020-0052860, filed on Apr. 29, 2020, in the Korean Intellectual Property Office, the disclosure of which is incorporated by reference herein in its entirety.

BACKGROUND

1. Field

The disclosure relates to a display apparatus and a control method thereof, and for example, to a display apparatus that image processes content and displays the image processed content, and a control method thereof.

2. Description of Related Art

With the development of image equipment, high quality content is being produced. In particular, recently, contents with a frame rate of 120 Hz or more have been produced.

When such content is played back, if an operating frequency of a display apparatus is 120 Hz or more, the frame rate of the content may be displayed as is, but most conventional display apparatuses have an operating frequency of 60 Hz or less.

For example, as illustrated in FIG. 1, a display apparatus operating at 60 Hz may display content with some frames of the content omitted to playback the content of 120 Hz. In this case, there may be the problem of the content not being played back smoothly.

Upgrading a hardware specification of a display apparatus may be one method to resolving the problems described above. However, in order for the display apparatus to playback content with a frame rate of 120 Hz or more, there may be the problem of manufacturing costs rising.

For example, when one frame of a content with a frame rate of 120 Hz is displayed, the entire display area must be scanned for 1/120 seconds. In addition, the time for displaying one pixel line has become shorter because of the resolution of the display apparatus increasing. For example, in the case of a 8K resolution display apparatus, the horizontal and vertical lengths of a pixel is 7680×4320, and because scanning is carried out in a vertical direction, one pixel line may be scanned for 1/(120×4320)s in the above-described example.

If a 60 Hz content is displayed in a 4K resolution display apparatus, one pixel line may be scanned for 1/(60×2160)s. That is, it may be necessary to reduce a scanning time of one pixel line significantly short to playback a high quality content, and in this case, there may be the problem of the manufacturing costs of the display apparatus increasing excessively.

Accordingly, there is a need to develop a method for increasing a response characteristic of a content while reducing manufacturing costs of a display apparatus.

SUMMARY

Embodiments of the disclosure provide a display apparatus for improving a response characteristic while maintaining a native resolution of the display apparatus and a control method thereof.

According to an example embodiment, a display apparatus includes: a display panel configured to drive a frame of a first resolution at a first frame rate, a communication interface comprising circuitry configured to receive content, and a processor configured to: based on a frame rate of the received content being greater than the first frame rate, adjust the received content to a second resolution, and control the display panel to display the content of the second resolution at a second frame rate, the second frame rate being greater than the first frame rate.

The display panel may comprise a plurality of gate lines and a plurality of data lines, and is configured to concurrently drive drives two adjacent gate lines of the plurality of gate lines, wherein each of the plurality of data lines are configured to provide data to a pixel of a same column.

The processor may be configured to repeatedly display a one pixel line of the content of the second resolution through two adjacent gate lines of the plurality of gate lines.

The display panel may display one frame for a first time corresponding to the first frame rate, and wherein the processor may be configured to control the display panel to display one frame of a content of the second resolution for a second time, the second time being less than the first time and corresponding to the second frame rate.

The processor may be configured to adjust the received content to the second resolution based on an equal value of a vertical resolution of the display panel.

The processor may be configured to adjust a horizontal resolution of the content based on a horizontal resolution of the display panel, and to adjust a vertical resolution of the content based on an equal value of a vertical resolution of the display panel.

The processor may be configured to identify an equal value of a vertical resolution of the display panel based on a frame rate of the content and the first frame rate.

The first frame rate may be a maximum frame rate which the display panel is capable of outputting, and wherein the vertical resolution of the display panel is a number of pixels arranged in a vertical direction of a plurality of pixels of the display panel.

The processor may, based on the content being a first type, be configured to adjust the content to the second resolution, and based on the content being a second type, to control the display panel to display the content at the first frame rate without adjusting the resolution of the content.

The processor may, based on a frame rate of the content being identical with the first frame rate, be configured to increase the frame rate of the content by performing frame interpolation on the content, and to adjust the content with the frame rate increased to the second resolution.

The processor may, based on a user command increasing a frame rate being input, be configured to adjust the received content to the second resolution.

According to an example embodiment, a method of controlling a display apparatus includes: receiving content, adjusting the received content to a second resolution based on a frame rate of the received content being greater than a first frame rate of a display panel, and displaying content of the second resolution at a second frame rate, the second frame rate being greater than a first frame rate, wherein the display panel is configured to drive a frame of a first resolution at the first frame rate.

The display panel may comprise a plurality of gate lines and a plurality of data lines, wherein the each of the plurality of data lines provide data to a pixel of a same column, and wherein the displaying may comprise concurrently driving two adjacent gate lines of the plurality of gate lines.

The displaying may comprise repeatedly displaying a one pixel line of a content of the second resolution through two adjacent gate lines of the plurality of gate lines.

The display panel may display one frame for a first time corresponding to the first frame rate, and wherein the displaying may comprise displaying one frame of a content of the second resolution for a second time, the second time being less than the first time and corresponding to the second frame rate.

The adjusting may comprise adjusting the received content to the second resolution based on an equal value of a vertical resolution of the display panel.

The adjusting may comprise adjusting a horizontal resolution of the content based on a horizontal resolution of the display panel, and adjusting a vertical resolution of the content based on an equal value of a vertical resolution of the display panel.

The method may further comprise identifying an equal value of a vertical resolution of the display panel based on a frame rate of the content and the first frame rate.

The first frame rate may be a maximum frame rate which the display panel is capable of outputting, and wherein a vertical resolution of the display panel is a number of pixels arranged in a vertical direction of a plurality of pixels of the display panel.

The adjusting and displaying may comprise, based on the content being a first type, adjusting the content to the second resolution and displaying at the second frame rate, and based on the content being a second type, displaying the content at the first frame rate without adjusting the resolution of the content.

According to various example embodiments, the display apparatus may, by adjusting the resolution of the frame to reduce the time in which the frame is displayed, improve the response characteristic.

In addition, the display apparatus may be implemented at a low cost because the display apparatus is capable of being operated at a relatively low operating frequency compared to the frame rate of the content.

With contents being produced at high resolution, the image quality perceived by the user may not significantly deteriorate despite reducing the vertical resolution of the content by half, and with the response characteristic improved, a smoother image may be output.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
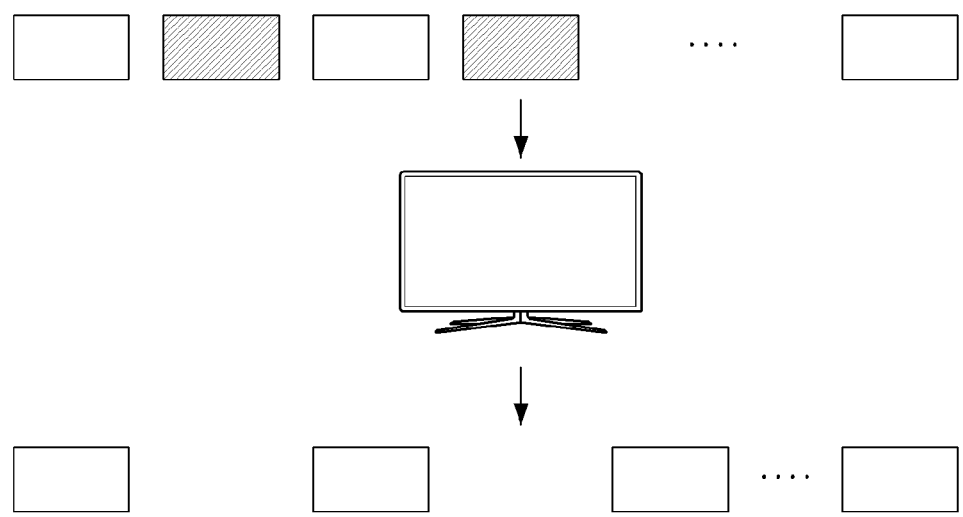
FIG. 1 is a diagram illustrating a problem of conventional technology.

The example embodiments of the disclosure may be diversely modified. Accordingly, various example embodiments are illustrated in the drawings and are described in greater detail. However, it is to be understood that the disclosure is not limited to a specific example embodiment, but includes all modifications, equivalents, and substitutions without departing from the scope and spirit of the present disclosure. Also, well-known functions or constructions may not described in detail where they would obscure the disclosure with unnecessary detail.

Hereinafter, the disclosure will be described in greater detail with reference to the accompanying drawings.

The terms used in describing the embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and this case, the meaning of the term will be disclosed in greater detail in the corresponding description. Accordingly, the terms used herein are not to be understood simply as its designation but based on the meaning of the term and the overall context of the disclosure.

Expressions such as "comprise", "may comprise", "consist", or "may consist of" used herein are to be understood as designating a presence of a corresponding characteristic (e.g., elements such as a number, a function, an operation, and a component), and do not exclude the presence of an additional characteristic.

The expression at least one of A and/or B should be understood to represent "A" or "B" or any one of "A and B".

Expressions such as "first", "second", and so on used herein may be used to refer to various elements regardless of order and/or importance. Further, it should be noted that the expressions are merely used to distinguish an element from another element and not to limit the corresponding elements.

A singular expression includes a plural expression, unless otherwise specified. It is to be understood that the terms such as "comprise" or "consist of" are used herein to designate a presence of a characteristic, a number, a step, an operation, an element, a component, or a combination thereof, and not to preclude a presence or a possibility of adding one or more of other characteristics, numbers, steps, operations, elements, components or a combination thereof.

In this disclosure, the term "user" may refer to a person using a display apparatus or an apparatus (e.g., an artificial intelligence electronic apparatus) using a display apparatus.

Example embodiments of the disclosure will be described in greater detail below with reference to the drawings.

Figure 2A:
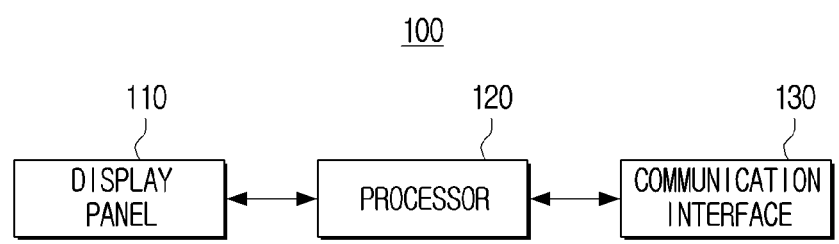
FIG. 2A is a block diagram illustrating an example configuration of a display apparatus according to an embodiment of the disclosure.

FIG. 2A is a block diagram illustrating an example configuration of a display apparatus 100 according to an embodiment of the disclosure.

The display apparatus 100, as an apparatus that displays content, may be, for example, and without limitation, a television (TV), a desktop personal computer (PC), a notebook, a video wall, a large format display (LFD), a digital signage, a digital information display (DID), a projector display, a digital video disk (DVD) player, a refrigerator, a smartphone, a tablet PC, a monitor, smart glasses, a smart watch, and the like, and may be any apparatus so long as the apparatus is capable of displaying content.

Referring to FIG. 2A, the display apparatus 100 may include a display panel 110, a processor (e.g., including processing circuitry) 120, and a communication interface (e.g., including communication circuitry) 130. However, the embodiment is not limited thereto, and the display apparatus 100 may be implemented in a form with some configurations excluded, and other configurations further included.

The display panel 110 may include a plurality of pixels, and may display image signals. For example, the display panel 110 may, if implemented in 8K resolution, may include a plurality of pixels of 7680×4320. The display panel may, if implemented to 4K resolution, include a plurality of pixels of 3840×2160. However, the embodiment is not limited thereto, and the display panel may be realized in various resolutions.

The each of the plurality of pixels included in the display panel 110 may be comprised of sub pixels representing, for example, and without limitation, red (R), green (G), and blue (B). In another example, the pixel may also include sub pixels representing white (W) in addition to the RGB. However, the embodiment is not limited thereto, and the each of the plurality of pixels may be realized in various forms.

The display panel 110 may include a plurality of gate lines and a plurality of data lines. The gate line may refer, for example, to a line that transfers a scanning signal or a gate signal, and the data line may refer, for example, to a line that transfers data voltage. For example, each of a plurality of sub pixels included in the display panel 110 may be connected to one gate line and one data line. For example, each of a plurality of data lines may provide data to a pixel of a same column. In other words, the display panel 110 may be a panel of a 1D1G stripe structure.

The display panel 110 may sequentially drive the plurality of gate lines, or may concurrently drive some of the plurality of gate lines. For example, the display panel 110 may concurrently drive two adjacent gate lines of the plurality of gate lines. The display panel 110 may be any panel so long as it is a panel with a driving structure capable of concurrently driving the plurality of gate lines.

The display panel 110 may drive a frame of a first resolution at a first frame rate. The first frame rate may, for example, be a maximum frame rate capable of being output by the display panel 110. For convenience of description, an operating frequency and a first frame rate of the display panel 110 will be used interchangeably in the disclosure and are described below.

The display panel 110 may be implemented to display one frame during a first time corresponding to a first frame rate. For example, the display panel 110 may display one frame during 1/60 s. If the display panel 110 is a 60 Hz panel of 7680×4320 resolution, the display panel 110 may display one frame with 7680×4320 resolution for 1/60 s on a display panel comprised of 7680×4320 pixels, and if the display panel 110 is a 60 Hz panel of 3840×2160 resolution, the display panel 110 may display one frame with 3840×2160 resolution for 1/60 s on a display panel comprised of 3840×2160 pixels.

The first time may, for example, be time spent until all of the plurality of gate lines included in the display 110 are driven sequentially. For example, if the display panel is a 60 Hz panel of 7680×4320 resolution, the display panel 110 may, through a method of driving a gate line corresponding to 7680 pixels included in a first row, and sequentially driving a gate line corresponding to 7680 pixels included in a second row, perform driving until a gate line corresponding to 7680 pixels included in a four thousand three hundred and twentieth (4320th) row. Through this operation, one frame may be displayed, and the time for displaying one frame may refer to the time spent until all gate lines included from the first row to the 4320th row are driven.

However, the embodiment is not limited thereto, and the processor 120 may be configured to control the display panel 110 to drive until the gate line corresponding to 7680 pixels included in the 4320th row is driven through the method of driving the pixels included in the first row and then driving the pixels included in an arbitrary row that is not the second row. For example, a scan direction of the display panel 110 may be implemented to an arbitrarily changed form that is not from an upper side to a lower side direction of the display panel.

In the above, the display panel 110 has been described as displaying one frame for 1/60 s, but the embodiment is not limited thereto, and the time spent for the display panel 110 to display one frame may vary based the type of the display 110.

The display panel 110 may be implemented as various types such as, for example, and without limitation, a liquid crystal display (LCD), an organic light emitting diode (OLED) display, a plasma display panel (PDP), a micro LED, a laser display, VR, glass, or the like. In the display, a driving circuit, a backlight unit, and the like, which may be implemented in the form of an a-si thin film transistor (TFT), a low temperature poly silicon (LTPS) TFT, an organic TFT (OTFT), and the like, may also be included. The display panel 110 may also be implemented as a touch screen coupled with a touch sensor, a flexible display, a three dimensional display (3D display), or the like.

The processor 120 may include various processing circuitry and control the overall operations of the display apparatus 100. For example, the processor 120 may control the overall operations of the display apparatus by being connected to each configuration of the display apparatus 100. For example, the processor 120 may be configured to control an operation of the display apparatus 100 by being connected to configurations such as, for example, and without limitation, a display panel 110, a communication interface 130, and a memory (not shown) and the like. In addition, the processor 120 may include various processing circuitry, such as, for example, and without limitation, an image processor (e.g., scaler; not shown) and a timing controller (TCON; not shown), or the like, but the configurations may be implemented as separate configurations, and the processor 120 may be configured to control an operation of the display apparatus 100 by being connected with configurations such as, for example, and without limitation, the image processor, the TCON, and the like.

According to an embodiment, the processor 120 may be implemented, for example, and without limitation, as a digital signal processor (DSP), a microprocessor, a time controller (TCON), or the like. However, the embodiment is not limited thereto, and the processor 120 may include, for example, and without limitation, one or more of a central processing unit (CPU), a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SOC) or a large scale integration (LSI) embedded with a processing algorithm, and as a form of a field programmable gate array (FPGA).

The processor 120 may be configured to, based on a frame rate of a content received through the communication interface 130 being greater than the first frame rate of the display apparatus 110, adjust the received content to a second resolution, and control the display 110 for the content of the second resolution to be displayed at a second frame rate, which is greater than a first frame rate.

The processor 120 may be configured to control the display panel 110 for the one frame included in the content of the second resolution to be displayed for a second time, which is less than a first time and corresponds to the second frame rate.

The operation may be possible as the processor 120 repeatedly displays one pixel line included in the content of the second resolution through two adjacent gate lines of the plurality of gate lines.

To describe the above operation, first, a resolution adjustment operation of a processor 120 will be described.

The processor 120 may adjust the content to the second resolution based on an equal value of a vertical resolution. For example, the processor 120 may, based on the display panel 110 being a panel of 7680×4320 resolution, adjust the resolution of the content based on the equal value of the vertical resolution of 4320.

An equal part may refer, for example, to dividing to equal size, and the equal value may refer, for example, to a size of each object based on the equal part. For example, a bisect value of 4320 may be 2160, and a quadrisect value may be 1080. Further, the vertical resolution of the display panel 110 may refer, for example, to the number of pixels arranged in a vertical direction of the plurality of pixels included in the display panel 110.

The processor 120 may adjust a horizontal resolution of the content based on a horizontal resolution of the display panel 110, and adjust the vertical resolution of the content based on the equal value of the vertical resolution. For example, the processor 120 may be configured to, based on the display 110 being a panel of 7680×4320 resolution, adjust the horizontal resolution of the content based on a horizontal resolution of 7680, and adjust the vertical resolution of the content based on the equal value, for example the bisect value of 2160, of the vertical resolution of 4320.

For example, the processor 120 may, based on the display panel 110 being a panel of 7680×4320 resolution and the resolution of the content being 7680×4320, adjust the vertical resolution of the content and adjust the resolution of the content to 7680×2160. The processor 120 may, based on the display panel 110 being a panel of 7680×4320 resolution and the resolution of the content being 3840×2160, adjust the horizontal resolution of the content and adjust the resolution of the content to 7680×2160. For example, the processor 120 may adjust at least one of the horizontal resolution or vertical resolution of the content based on the equal value of the horizontal resolution and the vertical resolution of the display panel 110. The adjustment of resolution may be performed, for example, by up scaling or down scaling.

The processor 120 may be configured to control the display panel 110 for one frame included in the content to which the resolution is adjusted to be displayed for a second time, which is less than a first time. The first time may be the time spent until all of the plurality of gate lines included in the display panel 110 are driven sequentially.

To describe a method of reducing time for the first frame to be displayed, an example of using a bisect value of the vertical resolution of the display panel 110 will be described.

The processor 120 may adjust the resolution of the content based on the bisect value of the vertical resolution of the display panel 110. For example, based on the resolution of the display panel 110 being 7680×4320 and the resolution of the content being 7680×4320, the processor 120 may adjust the resolution of the content to 7680×2160 based on a bisect value of 2160 of the vertical resolution of the display panel 110.

The processor 120 may be configured to, based on concurrently driving two adjacent gate lines of the plurality of gate lines included in the display panel 110, control the display panel 110 for a one frame to be displayed for a second time. For example, the processor 120 may display one pixel line included in a frame to which the vertical resolution is adjusted by driving two adjacent gate lines of the plurality of gate lines.

In the above-described example, the display panel 110 may include a gate line of 4320, the vertical resolution of the content to be displayed may be 2160, and the processor 120 may display a first pixel line of the content by driving the upper two gate lines of the display panel 110. The processor 120 may then drive the two gate lines directly under to display a second pixel line. Through this method, the processor 120 may sequentially display all pixel lines of the content.

In the case of conventional technology, the plurality of gate lines requires being driven 4320 times sequentially or based on a time divided by 4320 times to display one frame. However, in the case of the disclosure, because the two adjacent gate lines are concurrently driven, the plurality of gate lines are driven 2160 times sequentially or based on a time divided by 2160 times, and the time in which one frame is displayed may be reduced by half. That is, the time in which one frame is displayed may be reduced by lowering the vertical resolution of the content. Because the vertical resolution of the content is sufficiently a high resolution despite being lowered to 2160, there may be virtually no degradation in image quality. In other words, a viewer may not greatly notice the degradation in image quality.

In the above, the bisect value of the vertical resolution being used has been described, but this is merely an example embodiment. The equal value may be vary throughout. In addition, the resolution of the content may be adjusted based on a resolution lower than the vertical resolution of the display panel 110 and not the equal value of the vertical resolution of the display panel 110. For example, based on the display panel 110 including a gate line of 4320, the processor 120 may adjust the vertical resolution of the content to 617, and may concurrently drive seven continued gate lines. One gate line may remain, and the viewer may hardly recognize the one gate line remaining because of the very small pixels, despite not driving the remaining gate line.

The processor 120 may be configured to, based on the frame rate of the content being greater than the operating frequency of the display panel 110, adjust the resolution of the content based on the equal value of the vertical resolution, and control the display panel 110 for the one frame included in the content to which the resolution is adjusted to be displayed for a second time, which is less than a first time.

For example, if the display panel 110 is a 50 Hz panel and the frame rate of the content is 100 Hz or if the display panel is a 60 Hz panel and the frame rate of the content is 120 Hz, the processor 120 may be configured to adjust the resolution of the content based on the equal value of the vertical solution of the display panel 110, and control the display panel 110 for the one frame included in the content to which the resolution is adjusted to be displayed for a second time, which is less than a first time.

The processor 120 may identify the frame rate of the content and the equal value of the vertical resolution of the display panel 110 based on the first frame rate. For example, if the frame rate of the content is 120 Hz and the display panel 110 is a 60 Hz panel, the processor 120 may bisect the vertical resolution of the display panel 110. Alternatively, if the frame rate of the content is 240 Hz and the display 110 panel is a 60 Hz panel, the processor 120 may quadrisect the vertical resolution of the display panel 110. That is, the processor 120 may, based on a content of a resolution identical to the resolution of the display panel 110 being input, perform down scaling on the vertical resolution of the content to correspond to the bisect value or the quadrisect value of the vertical resolution of the display panel 110 based on the frame rate of the content and the operating frequency of the display panel 110.

The processor 120 may, by controlling the display panel 110 for a plurality of frames included in a content to which resolution is adjusted to be displayed for a first time, output content to correspond to the frame rate of the content. For example, if the frame rate of the content is 120 Hz and the display panel 110 is a 60 Hz panel, a conventional display apparatus would omit a part of the frames of the content and display one frame included in the content for a first time, that is, for 1/60 s. On the other hand, the processor 120 of the disclosure may adjust the resolution of the content based on the bisect value of the vertical resolution of the display panel 110 and control the display panel 110 for the one frame included in the content to which resolution is adjusted to be displayed for a second time, for example, for 1/120 s. The processor 120 may display two frames included in the content for a first time, that is, for 1/60 s, and this may refer, for example, to content being displayed to correspond to the frame of the content.

The processor 120 may be configured to adjust the content to a second resolution if the content is a first type, and control the display panel 110 to be displayed at a first frame rate without adjusting the resolution of the content if the content is a second type.

The processor 120 may, based on the frame rate of the content being greater than the operating frequency of the display panel 110 and the type of content being a first type, adjust the resolution of the content and control the display panel 110 for the one frame to be displayed for a second time, and based on the frame rate of the content being greater than the operating frequency of the display panel 110 and the type of content being a second type, control the display panel 110 for only a part of the plurality of frames included in the content to be displayed based on the operating frequency of the display panel 110.

For example, the processor 120 may, based on the frame rate of the content being greater than the operating frequency of the display panel 110 and the type of the content being a game content, adjust the resolution of the content and control the display panel 110 for the one frame to be displayed for a second time, and based on the frame rate of the content being greater than the operating frequency of the display panel 110 and the type of the content being another content such as a moving image that is not a game, control the display panel 110 for only a part of the plurality of frames included in the content to be displayed based on the operating frequency of the display panel 110.

However, the embodiment is not limited thereto, and a playback method of a content may be determined based on a user command regardless of the type of content. For example, the processor 120 may adjust the received content to a second resolution based on a user command for increasing the frame rate being input. The processor 120 may, based on a user command for reducing a response rate or changing to the original mode being input, display the content at a first frame rat without adjusting the resolution of the content. The processor 120 may be configured to control the display panel 110 for only a part of the plurality of frames included in the content to be displayed based on the first frame rate.

According to an embodiment, the user command described above may be provided to the user in a form of a specialized menu such as, for example, and without limitation, a game mode, sports mode, and the like.

The processor 120 may also identify a playback method of the content based on whether an up scaling of the received content is performed.

The content may, for example, be a content to which up scaling is performed before being stored in the display apparatus 100. For example, an original content may be up scaled to a 3840×2160 resolution or a 7680×4320 resolution by a server or the like, and the display apparatus 100 may receive and store content to which up scaling to a 7680×4320 resolution is performed.

The processor 120 may adjust the vertical resolution of the up scaled content based on the frame rate of the up scaled content, and control the display panel 110 for the one frame included in the content to which the vertical resolution is adjusted to be displayed for a second time, which is less than a first time.

For example, the display panel 110 may be a 60 Hz panel of 7680×4320 resolution and the frame rate of the content to which up scaling is performed to 7680×4320 resolution may be 120 Hz, and the processor 120 may be configured to, by adjusting the resolution of the up scaled content to 7680×2160 and concurrently driving two adjacent gate lines of the plurality of gate lines, control the display panel 110 for the one frame included in the content to be displayed for a second time.

The display panel 110 may be a 120 Hz panel of 7680×4320 resolution and the frame rate of the content to which up scaling is performed to 7680×4320 resolution may be 240 Hz, and the processor 120 may be configured to, by adjusting the resolution of the up scaled content to 7680×2160 and concurrently driving one or two adjacent gate lines of the plurality of gate lines, control the display panel 110 for the one frame included in the content to be displayed for a second time.

As described above, when using the up scaled content, degradation of image quality may not occur because the up scaled content corresponds to the vertical resolution of the original content despite adjusting the vertical resolution of the content.

The processor 120 may identify whether adjustment of resolution of the content is performed and a driving method of the plurality of gate lines based on at least one of an additional information or an image analysis of the content.

For example, the processor 120 may be configured to, if the content is identified as an up scaled content based on at least one of the additional information or image analysis of the content, adjust the resolution of the content based on the frame rate of the content and the operating frequency of the display panel 110, and control the display panel 110 for the one frame included in the content to which the resolution is adjusted to be displayed for a second time, which is less than a first time.

The processor 120 may be configured so that the vertical resolution of the content may maintain a greater state than the vertical resolution of the original content.

For example, the original content may be a resolution of 3840×2160, the up scaled content may be a resolution of 7680×4320, the frame rate of the original content and the up scaled content may be 240 Hz, and the display panel 110 may be a 60 Hz panel of 7680×4320 resolution. In this example, if the processor adjusts the resolution of the up scaled content to 7680×1080, because the adjusted resolution may be lower than the vertical resolution of the original content, the resolution of the up scaled content may be adjusted to 7680×2160. Because the vertical resolution of the up scaled content is bisected, the processor 120 may concurrently drive two adjacent gate lines of the plurality of gate lines, and display the one frame for 1/120 s. However, because the frame rate is 240 Hz, the processor 120 may not display some frames in the content to which resolution is adjusted to correspond to the operating frequency of the display panel 110.

Through this operation, the response characteristic may be improved without degrading the image quality of the content.

However, the embodiment is not limited thereto, and the method of adjusting the resolution described above and the method of not displaying some frames may be negotiated to various forms.

In the above, the frame rate of the content being greater than the first frame rate has been described, but the embodiment is not limited thereto, and the processor 120 may, based on the frame rate of the content being identical with the first frame rate, increase the frame rate of the content by performing frame interpolation on the content, and adjust the content with the increased frame rate to a second resolution.

The processor 120 may image process content received through the communication interface 130 and display the image processed content through the display panel 110. The processor 120 may also image process content being streamed through the communication interface 130 and display the image processed content through the display panel 110.

The communication interface 130 may include various communication circuitry and be configured to perform communication with external apparatuses of various types according to the communication methods of various types. The communication interface 130 may include, for example, and without limitation, a Wi-Fi module, a Bluetooth module, an infrared communication module, a wireless communication module, and the like. The respective communication module may be implemented in at least one hardware chip type.

The processor 120 may use the communication interface 130 to perform communication with the various external apparatuses. The external apparatus may include, for example, and without limitation, a server, a Bluetooth earphone, a display apparatus, and the like.

The Wi-Fi module and the Bluetooth module may perform communication using a Wi-Fi method and a Bluetooth method, respectively. When using the Wi-Fi module or the Bluetooth module, various connection information such as a service set identifier (SSID) and a session key may be transmitted and received first, and after performing communication connection using thereof, various information may be transmitted and received.

The infrared ray communication module may perform communication according to infrared data association (IrDA) technology that transmits data wirelessly at a close range using an infrared ray which is between visible rays and millimeter waves.

The wireless communication module may include at least one communication chip performing communication according to various communication standards such as ZigBee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

Other communication interfaces 130 may include, for example, and without limitation, at least one of a wired communication module performing communication using a local area network (LAN) module, an Ethernet module, a pair cable, a coaxial cable, an optical cable, or the like.

The communication interface 130 may further include an input and output interface. The input and output interface may be any one interface of a high-definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI).

The input and output interface may input or output at least one of an audio signal and a video signal.

According to an embodiment, the input and output interface may include a port for inputting and outputting only an audio signal and a separate port for inputting and outputting only a video signal, or may be implemented to one port for inputting and outputting both the audio signal and the video signal.

In FIG. 2A, the processor 120 has been described as adjusting the resolution of the content, and controlling the plurality of gate lines included in the display apparatus 110.

In FIG. 2A, although the processor 120 has been described as including a scaler for adjusting the resolution of the content and a time controller (TCON) for controlling the plurality of gate lines included in the display panel 110, the embodiment is not limited thereto, and other embodiments will be described below.

Figure 2B:
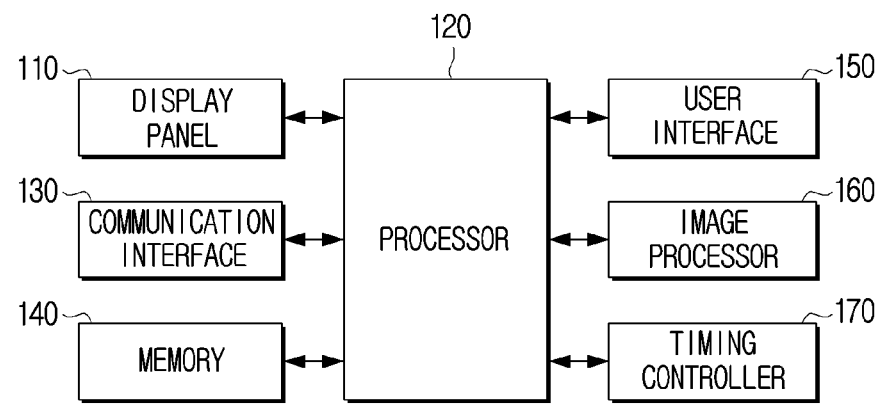
FIG. 2B is a block diagram illustrating an example configuration of a display apparatus according to an embodiment of the disclosure.

FIG. 2B is a block diagram illustrating an example configuration of a display apparatus 100 according to an embodiment of the disclosure.

Referring to FIG. 2B, the display apparatus 100 may further include, not only a display panel 110, a processor (e.g., including processing circuitry) 120, and a communication interface (e.g., including communication circuitry) 130, but also a memory 140, a user interface (e.g., including user interface circuitry) 150, an image processor (e.g., including image processing circuitry) 160 (e.g., scaler), and a timing controller (TCON) 170. The description on the configuration which overlaps with that of FIG. 2A in the configuration of FIG. 2B may not be repeated here.

The memory 140 may store content. The processor 120 may perform image processing on the content stored in the memory 140 and display through the display panel 110. In addition, the memory 140 may store information for displaying other content.

The memory 140 may be implemented as a non-volatile memory and/or a volatile memory, but is not limited thereto. For example, a hard disk may be used in place of the memory, and any configuration may be possible if the configuration is capable of storing data.

The user interface 150 may include various user interface circuitry and receive various user interaction. The user interface 150 may be implementable to various forms based on the embodiment of the display apparatus 100. For example, the user interface 150 may include a button provided on a display apparatus 100, a microphone for receiving user voice, a camera for detecting user motion, and the like. If the display apparatus 100 is implemented to a touch-based terminal apparatus, the user interface 150 may be implemented as a touch screen form comprising an inter-layer structure with a touch pad. The user interface 150 may be one configuration of the above-described display panel 110.

The image processor 160 may include various image processing circuitry and adjust the resolution of the content through the control of the processor 120. For example, the image processor 160 may perform up scaling or down scaling on the content through the control of the processor 120. The image processor 160 may change the resolution ratio of the content. For example, the image processor 160 may adjust the content with the resolution of 16:10 to a content of 16:5.

The timing controller 170 may include various timing control circuitry and receive input of an input signal (IS), a horizontal synchronization signal (Hsync), a vertical synchronization signal (Vsync), a main clock signal (MCLK), and the like from an external configuration, for example, the processor 120, and generate an image data signal, a scanning control signal, a data control signal, an emission control signal and the like to provide to the display panel 110.

The communication interface 130, the memory 140, the user interface 150, the image processor 160, and the timing controller 170 may be implemented as one configuration or only some configurations may be implemented as one configuration. In addition, at least one of the communication interface 130, the memory 140, the user interface 150, the image processor 160, or the timing controller 170 may be implemented in an integrated form with the display panel 110.

Unlike FIGS. 2A and 2B, the display apparatus 100 may also be simply implemented in the form of the display panel 110 including the time controller 170.

Figure 2C:
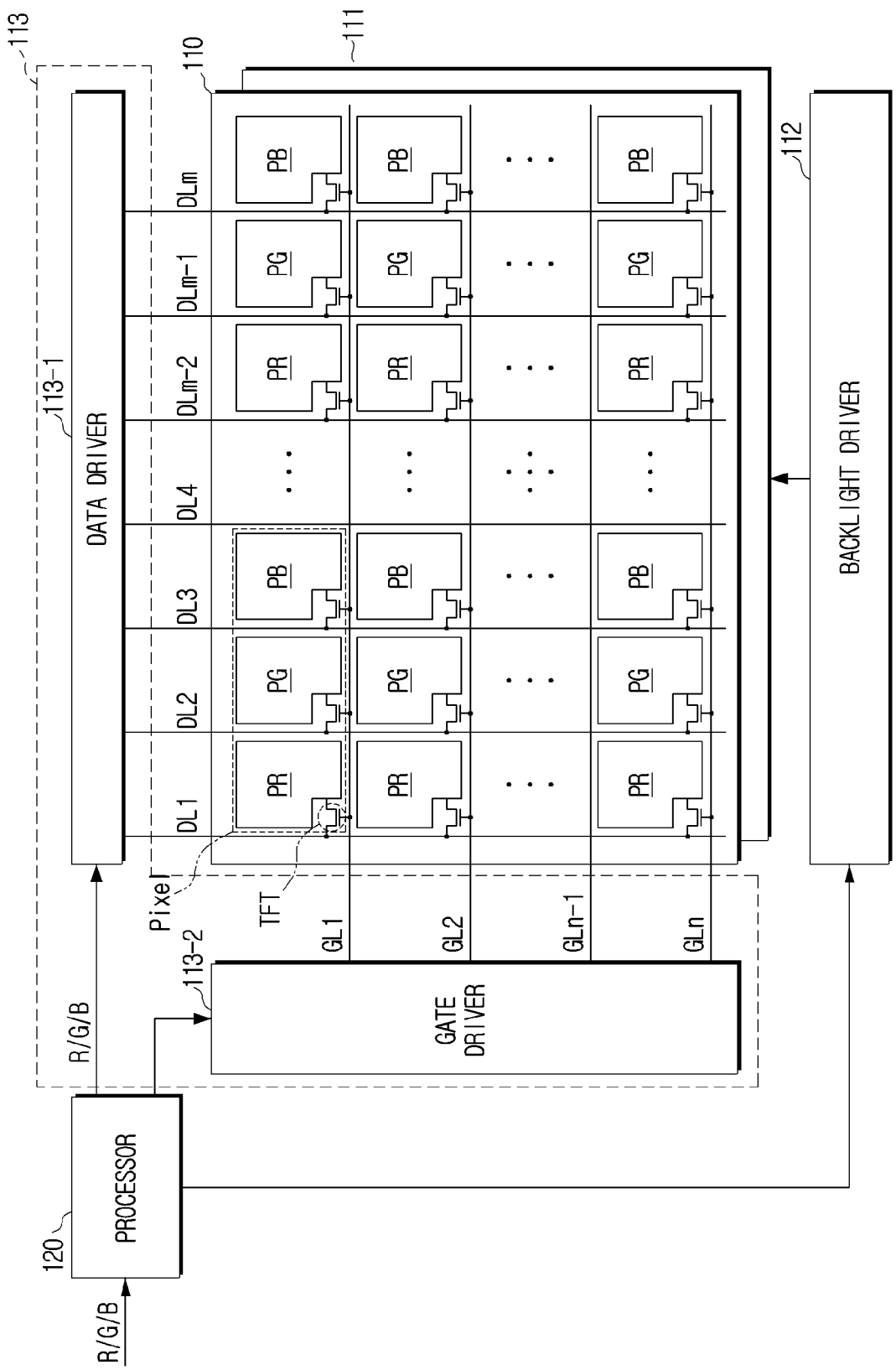
FIG. 2C is a diagram illustrating an example configuration of a display panel according to an embodiment of the disclosure.

FIG. 2C is a diagram illustrating an example configuration of a display panel 110 according to an embodiment of the disclosure.

The display panel 110 may be formed so that the gate lines (GL1 to GLn) and the data lines (DL1 to DLm) intersect with each other, and R, G, B sub pixels (e.g., PR, PG and PB) may be formed at an area provided by the intersecting thereof. The adjacent R, G, B sub pixels (e.g., PR, PG and PB) may form one pixel. In other words, each pixel may reproduce a color of a subject in three primary colors of a red color (R), a green color (G), and a blue color (B) by including an R sub pixel (PR) representing the red color (R), a G sub pixel (PG) representing the green color (G), and a B sub pixel (PB) representing the blue color (B).

If the display panel 110 is implemented as an LCD panel, each sub pixel (e.g., PR, PG and PB) may include a pixel electrode and a common electrode, and light transmissivity may change as a liquid crystal arrangement is changed by an electric field formed by a potential difference between both electrodes. The TFTs formed at the intersections of the gate lines (GL1 to GLn) and the data lines (DL1 to DLm) may provide video data, that is, red color (R), the green color (G), and the blue color (B) data, from the data lines (DL1 to DLm) to the pixel electrode of each sub pixel (e.g., PR, PG and PB) in response to a scan pulse from each gate line (GL1 to GLn).

The display panel 110 may further include a backlight unit 111, a backlight driver 112, and a panel driver 113.

The backlight driver 112 may be implemented in a form including a driver integrated circuit (IC) for driving the backlight unit 111. According to an embodiment, the driver IC may be implemented as a hardware separate from the processor 120. For example, if the light sources included in the backlight unit 111 are implemented as an LED device, the driver IC may be implemented as at least one LED driver which controls the current applied to the LED device. According to an embodiment, the LED driver may be disposed at a rear end of a power supply (e.g., a switching mode power supply (SMPS)) and receive voltage applied from the power supply. However, according to another embodiment, voltage may be received from a separate power supply. Implementing the SMPS and the LED driver in the form of an integrated module may also be possible.

The panel driver 113 may be implemented in a form including a driver IC for driving the display panel 110. According to an embodiment, the driver IC may be implemented as a hardware separate from the processor 120. For example, the panel driver 113 may include a data driver 113-1 which provides video data to the data lines and a gate driver 113-2 which provides a scan pulse to the gate lines.

The data driver 113-1 may, as a method of generating a data signal, receive image data of R/G/B components from the processor 120 or the time controller 170 and generate a data signal. In addition, the data driver 113-1 may be connected to the data line (DL1, DL2, DL3, . . . , and DLm) of the display panel 110 and apply the generated data signal to the display panel 110.

The gate driver 113-2 (or, scan driver) may, to generate a gate signal (or, scan signal), be connected to the gate line (GL1, GL2, GL3, . . . , GLn) and transfer a gate signal to a specific row of the display panel 110. In the pixel to which the gate signal is transferred, a data signal output from the data driver 113-1 may be transferred.

The processor 120 may control the gate driver 113-2 and concurrently drive at least two gate lines. For example, the processor 120 may transfer a signal to at least one of the data driver 113-1 or the gate driver 113-2 and control the display panel 110. Through this operation, the display time of the frame is reduced, and content may be displayed at a frame rate higher than the operating frequency of the display panel 110.

The operation of the processor 120 will be described in greater detail below through the various drawings. The respective embodiments in the drawings below may be implemented individually or in combination thereof.

Figure 3A:
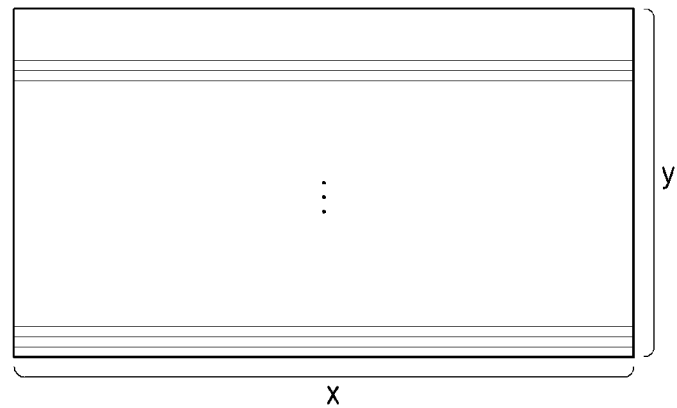
FIG. 3A is a diagram illustrating an example driving method of a display panel according to an embodiment of the disclosure.

FIGS. 3A. 3B, 3C, 3D and 3E are diagrams illustrating example driving methods of a display panel 110 according to an embodiment of the disclosure.

The display panel 110 may be implemented as a panel of x×y resolution. For example, the display panel 110 may be implemented as a panel of 7680×4320 resolution. The display panel 110 may also be implemented as a panel of 3840×2160 resolution. However, this is merely an example embodiment, and the display apparatus 110 may be realized in various other resolutions. In addition, a ratio of the horizontal length and vertical length of the display panel 110 may also be varied such as 21:9, 32:9, and the like.

FIG. 3A illustrates a display panel 110 implemented as a panel of x×y resolution, and for convenience of description, only the vertical resolution is displayed in a divided state. For example, the display panel 110 implemented to a panel of x×y resolution may be divided into a horizontally long area by a number of y.

The horizontally long area by the number of y may be driven through a gate line. For example, the display panel 110 may include a gate line of the number of y.

Figure 3B:
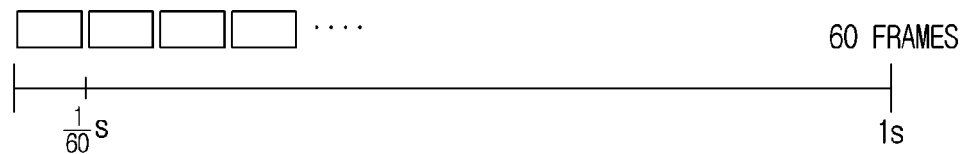
FIG. 3B is a diagram illustrating an example driving method of a display panel according to an embodiment of the disclosure.

According to an embodiment, FIG. 3B is a diagram illustrating an operating frequency of a display panel 110 according to an embodiment of the disclosure. In FIG. 3B, the display panel 110 may be a 60 Hz panel.

As illustrated in FIG. 3B, the display panel 110 may display 60 frames in 1 second. For example, the display panel 110 may display 1 frame for 1/60 s.

The display panel 110 may sequentially drive gate lines of y number to display 1 frame for 1/60 s. If one gate line is driven at one time, the unit time for one gate line being driven may be 1/(60×y)s, and if all gate lines are driven, because of being repeated by y number of times, a time of 1/60 s may be spent.

According to an embodiment, if two gate lines are concurrently driven, the unit time may be 1/(60×y)s, but because the number of times repeated for driving all gate lines is y/2 times, a time of 1/120 s may be spent.

Figure 3C:
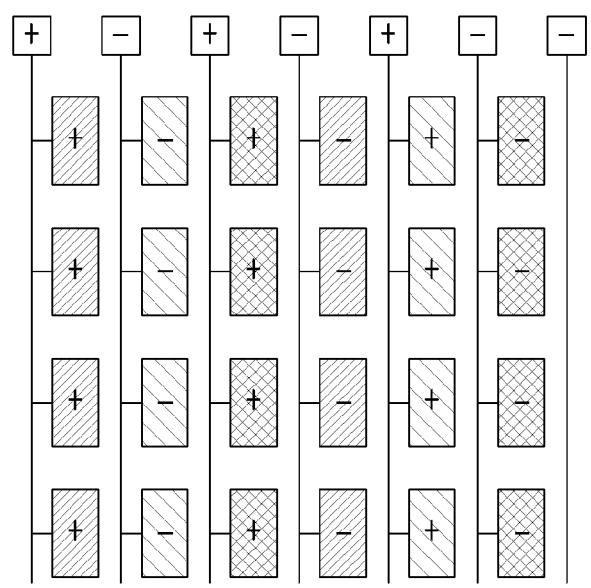
FIG. 3C is a diagram illustrating an example driving method of a display panel according to an embodiment of the disclosure.

In addition, when two gate lines are concurrently driven, pixels adjacent in a vertical direction may display the same color with one another. For example, for the pixels adjacent in the vertical direction to display the same color with one another, the display panel 110 may be implemented as a panel of a 1D1G stripe structure as illustrated in FIG. 3C. A gate terminal of the pixels adjacent in the vertical direction may be concurrently turned-on, and the two pixels adjacent in the vertical direction may display the same color because the same data value is input.

Figure 3D:
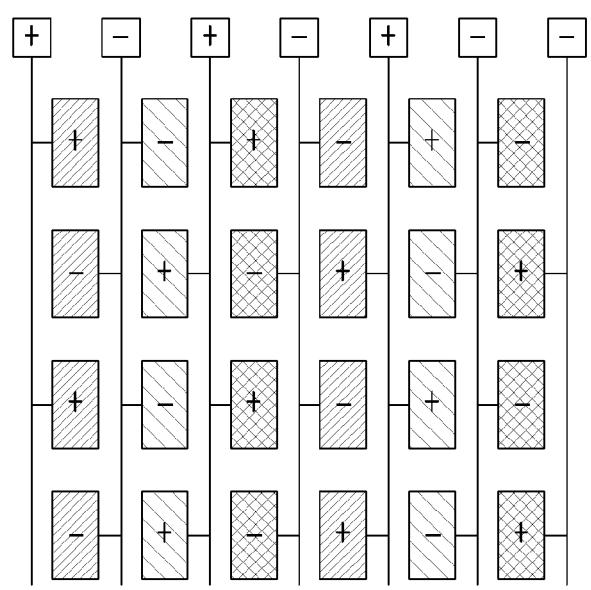
FIG. 3D is a diagram illustrating an example driving method of a display panel according to an embodiment of the disclosure.
Figure 3E:
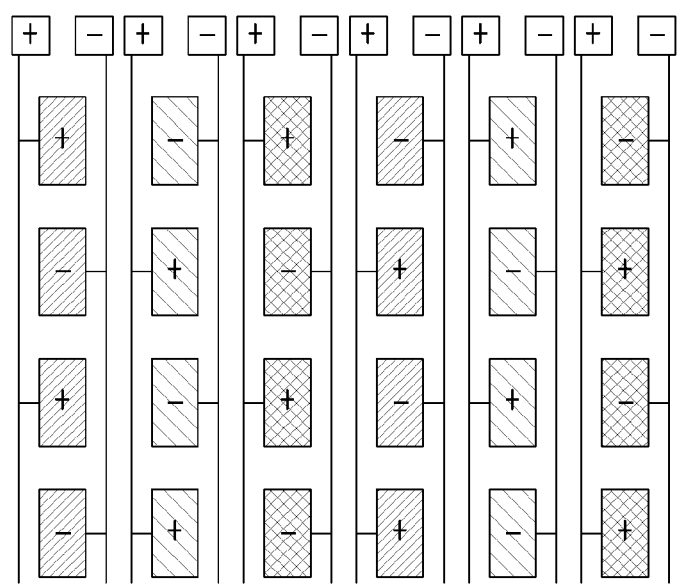
FIG. 3E is a diagram illustrating an example driving method of a display panel according to an embodiment of the disclosure.

On the other hand, in the case of a panel of a 1D1G crossed structure in FIG. 3D or a panel of 2DHG structure in FIG. 3E, even when the first gate line and the second gate line are concurrently driven, because the data value input to the pixels adjacent in the vertical direction is different, the two pixels adjacent in the vertical direction may display different colors, and the disclosure may not be applied. However, even in the case of a panel of 1D1G crossed structure or a panel of 2DHG structure, if it is a technique capable of displaying the same color by concurrently driving pixels adjacent in the vertical direction, the disclosure may be applied.

Figure 4A:
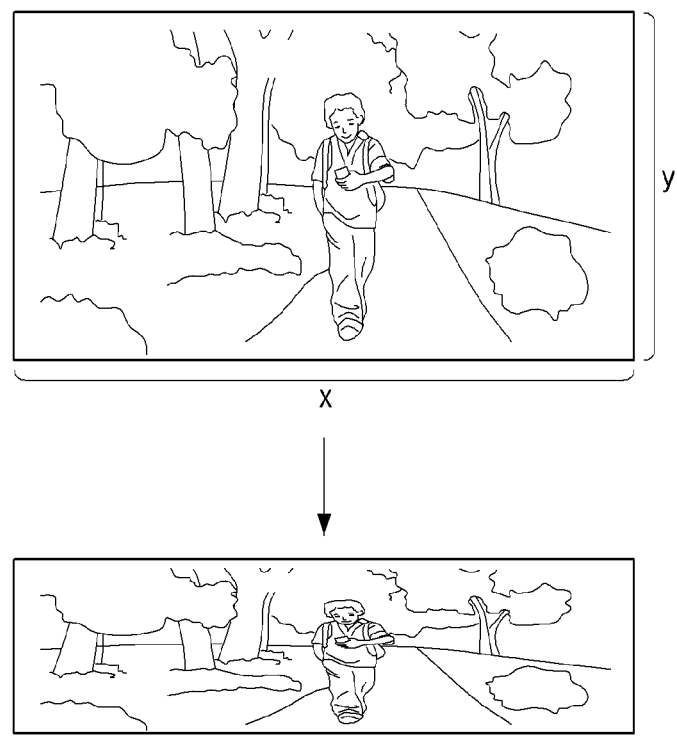
FIG. 4A is a diagram illustrating an example operation of displaying content according to an embodiment of the disclosure.
Figure 4B:
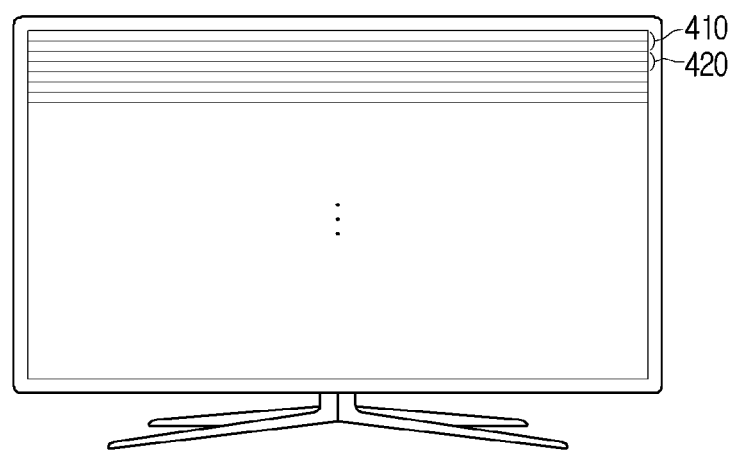
FIG. 4B is a diagram illustrating an example operation of displaying content according to an embodiment of the disclosure.
Figure 4C:
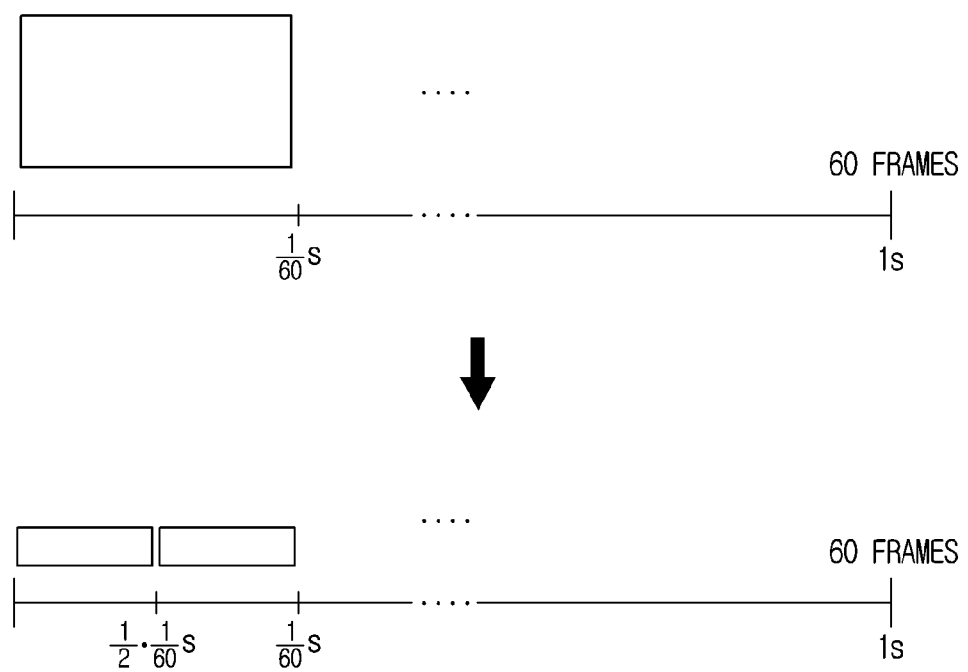
FIG. 4C is a diagram illustrating an example operation of displaying content according to an embodiment of the disclosure.

FIGS. 4A, 4B and 4C are diagrams illustrating an example operation of displaying content according to an embodiment of the disclosure. In FIGS. 4A, 4B and 4C, the display panel 110 may be a 60 Hz panel, and the frame rate of the content may be 120 Hz.

The processor 120 may adjust the resolution of the content based on the equal value of the vertical resolution of the display panel 110. For example, as illustrated in FIG. 4A, the processor 120 may, based on the display panel 110 being a panel of 7680×4320 resolution, adjust the resolution of the content to 7680×2160.

The processor 120 may concurrently drive the two adjacent gate lines of the plurality of gate lines included in the display panel 110. For example, as illustrated in FIG. 4B, the processor 120 may display a pixel line of a first row of the content to which resolution is adjusted to 7680×2160 by driving the upper end two adjacent gate lines 410. The processor 120 may then display a pixel line of a second row of the content to which resolution is adjusted to 7680×2160 by driving the next upper end two adjacent gate lines 420.

Through this method, the processor 120 may reduce the time for displaying one frame by half. For example, the processor 120 may, based on not performing the operation as in FIGS. 4A and 4B, display one frame for 1/60 s as illustrated on the upper end of FIG. 4C. On the other hand, the processor may, based on performing the operation as in FIGS. 4A and 4B, display one frame for 1/120 s as illustrated on the lower end of FIG. 4C. That is, the processor 120 may display two frames for 1/60 s.

The processor 120 may, in the case of the upper end of FIG. 4C, display 60 frames for 1 second, but in the case of the lower end of FIG. 4C, display 120 frames for 1 second. For example, the processor 120 may, while maintaining the driving speed of the gate line of the display panel 110 as is, reduce the time in which one frame is displayed through the lowering of vertical resolution and provide an effect of appearing as if the frame rate is increased.

Figure 5A:
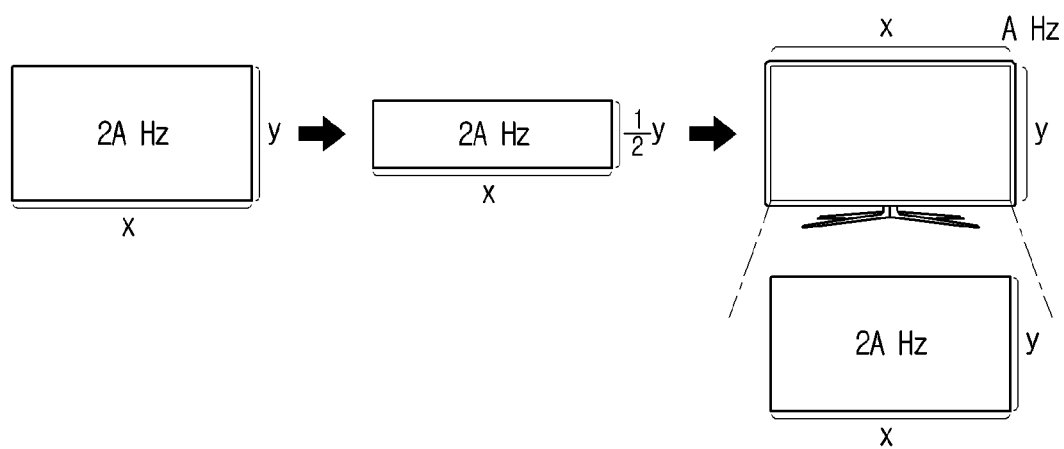
FIG. 5A is a diagram illustrating an example method of adjusting a resolution according to an embodiment of the disclosure.
Figure 5B:
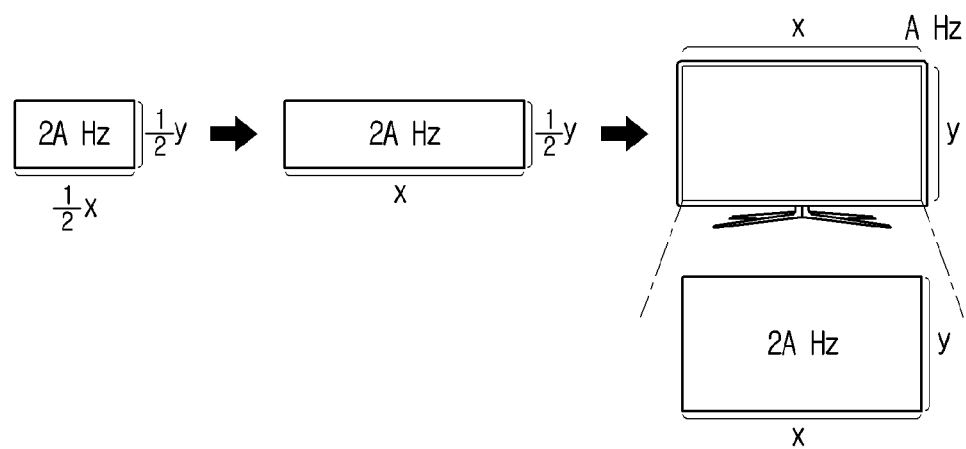
FIG. 5B is a diagram illustrating an example method of adjusting a resolution according to an embodiment of the disclosure.

FIGS. 5A and 5B are diagrams illustrating an example method of adjusting a resolution according to an embodiment of the disclosure. In FIGS. 5A and 5B, the display panel 110 may be a A Hz panel of a×x×y resolution.

The processor 120 may adjust at least one of the horizontal resolution or the vertical resolution of the content based on the equal value of the horizontal resolution and the vertical resolution of the display panel 110.

For example, the processor 120 may, as illustrated in FIG. 5A, adjust the resolution of the content to x×y/2 if the resolution of the content is x×y and the frame rate is 2 A Hz. The processor 120 may, as illustrated in FIG. 5B, adjust the resolution of the content to x×y/2 if the resolution of the content is x/2×y/2 and the frame rate is 2 A Hz.

If the display panel 110 is a 60 Hz panel of 7680×4320 resolution, the resolution of the content is 7680×4320 and the frame rate is 120 Hz, the processor 120 may adjust the resolution of the content to 7680×2160. If the display panel 110 is a 60 Hz panel of 7680×4320 resolution, the resolution of the content is 3840×2160 and the frame rate is 120 Hz, the processor may adjust the resolution of the content to 7680×2160.

The processor 120 may, if the resolution of the content is x×y and the frame rate is 4 A Hz, adjust the resolution of the content to x×y/4. For example, if the display panel is a 60 Hz panel of 7680×4320 resolution, the resolution of the content is 7680×4320 and the frame rate is 240 Hz, the processor 120 may adjust the resolution of the content to 7680×1080. That is, based on the frame rate of the content and the operating frequency of the display panel 110, a scaling ratio of the content may be varied.

The processor 120 may, if the resolution of the content is x/4×y/4 and the frame rate is 2 A Hz, adjust the resolution of the content to x×y/2. For example, if the display panel 110 is a 60 Hz panel of 7680×4320 resolution, the resolution of the content is 1920×1080 and the frame rate is 120 Hz, the processor 120 may adjust the resolution of the content to 7680×2160.

The processor 120 may, if the resolution of the content is 2x×2y and the frame rate is 2 A Hz, adjust the resolution of the content to x×y/2.

For example, the processor 120 may adjust the horizontal resolution of the content to correspond to the horizontal resolution of the display panel 110, and adjust the vertical resolution of the content to correspond to the equal value of the vertical resolution of the display panel 110.

Figure 6A:
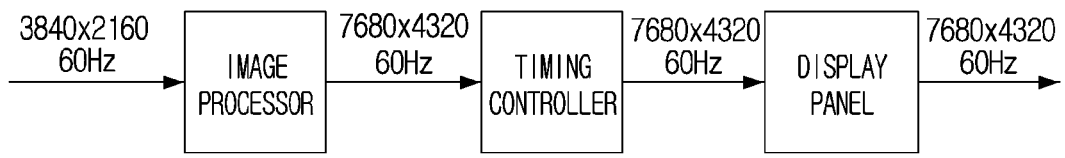
FIG. 6A is a diagram illustrating an example configuration of a processor according to an embodiment of the disclosure.
Figure 6B:
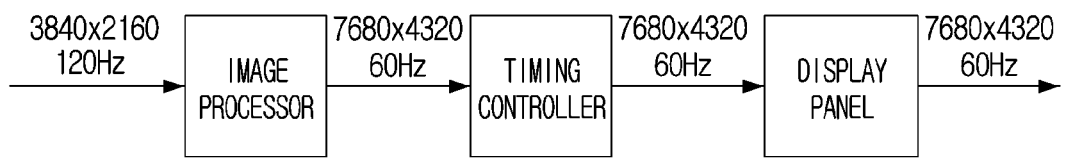
FIG. 6B is a diagram illustrating an example configuration of a processor according to an embodiment of the disclosure.
Figure 6C:
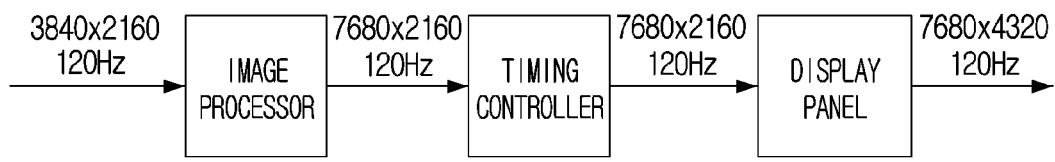
FIG. 6C is a diagram illustrating an example configuration of a processor according to an embodiment of the disclosure.

FIGS. 6A, 6B and 6C are diagrams illustrating an example configuration of a processor 120 according to an embodiment of the disclosure. In FIGS. 6A, 6B and 6C, the display panel 110 may be a 60 Hz panel of 7680×4320 resolution.

The processor 120 may include an image processor (scaler) for adjusting the resolution of the content and a timing controller (TCON) for generating an input signal on the display panel 110. The image processor and the timing controller may be implemented as an independent IC. The timing controller may be included in the display panel 110.

In FIG. 6A, which is a diagram illustrating conventional technology, the image processor may adjust the content with a resolution of 3840×2160 at 60 Hz to a resolution of 7680×4320 based on the resolution of the display panel 110. The timing controller may then output the content with the resolution of 7680×4320 at 60 Hz as is, and the display panel 110 may output content at 60 Hz and to the resolution of 7680×4320.

In FIG. 6B, which also is a diagram illustrating conventional technology, the image processor may adjust the content with a resolution 3840×2160 at 120 Hz to a frame rate of 60 Hz and a resolution of 7680×4320 based on the operating frequency and the resolution of the display panel 110. The timing controller may then output the content with the resolution of 7680×4320 at 60 Hz as is, and the display panel 110 may output content at 60 Hz and to a resolution of 7680×4320.

In FIG. 6C, which is a diagram illustrating an example embodiment of the disclosure, the image processor may adjust the content with a resolution of 3840×2160 at 120 Hz to a frame rate of 120 Hz and a resolution of 7680×2160 based on the operating frequency and the resolution of the display panel 110. The timing controller may then output the content with the resolution of 7680×2160 at 120 Hz to a frame rate of 120 Hz and a resolution of 7680×2160, and the display panel 110 may output content at 120 Hz and to a resolution of 7680×4320 through the method of concurrently driving two adjacent gate lines.

Figure 7:
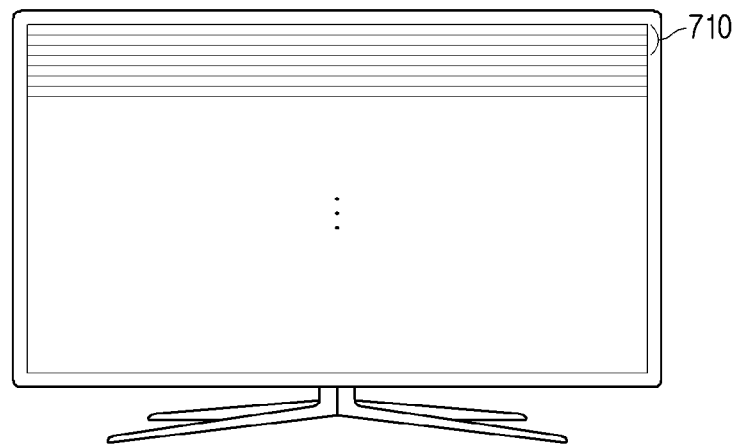
FIG. 7 is a diagram illustrating an example method of outputting content at various frame rates according to an embodiment of the disclosure.

FIG. 7 is a diagram illustrating an example method of outputting content at various frame rates according to an embodiment of the disclosure.

In the above, using a bisect value of the vertical resolution of the display panel 110 has been described for the convenience of description, but the embodiment is not limited thereto.

For example, if the display panel is a 60 Hz panel of 7680×4320 resolution and a content with a resolution of 7680×4320 at 180 Hz is played back, the processor 120 may adjust the resolution of the content to 7680×1440, and display one pixel line by concurrently driving three adjacent gate lines 710 included in the display panel 110 as illustrated in FIG. 7.

For example, through the method of concurrently driving three adjacent gate lines 710, the time in which one frame is displayed may be reduced from 1/60$s$ to 1/180$s$. The display panel 110 may display 180 frames for 1 second.

The operation may be variously performed based on the frame rate of the content. For example, if the display panel 110 is a 60 Hz panel of 7680×4320 resolution and a content with a resolution of 7680×4320 at 240 Hz is played back, the processor 120 may adjust the resolution of the content to 7680×1080, and display one pixel line by concurrently driving four adjacent gate lines included in the display panel 110. The display panel 110 may display 240 frames for 1 second.

In FIG. 7, the method of adjusting the resolution and the number of gate lines which may be concurrently driven being identified has been described based on the operating frequency of the display panel 110 and the frame rate of the content, but the embodiment is not limited thereto. For example, the method of adjusting the resolution and the number of gate lines that are concurrently driven may be based on at least one of the user command or the type of content.

For example, if the display panel is a 60 Hz panel of 7680×4320 resolution and the content with a resolution of 7680×4320 at 240 Hz is being played back, the processor 120 may, based on a first user command being input, adjust the resolution of the content to 7680×1080, and concurrently drive the four adjacent gate lines included in the display panel 110 and display one pixel line. The content may be displayed at 240 Hz.

The processor 120 may, based on a second user command being input, adjust the resolution of the content to 7680×2160, and concurrently drive two adjacent gate lines included in the display panel 110 to display one pixel line. The processor 120 may, by displaying only a part of the plurality of frames included in the content, display the content at 120 Hz.

Figure 8:
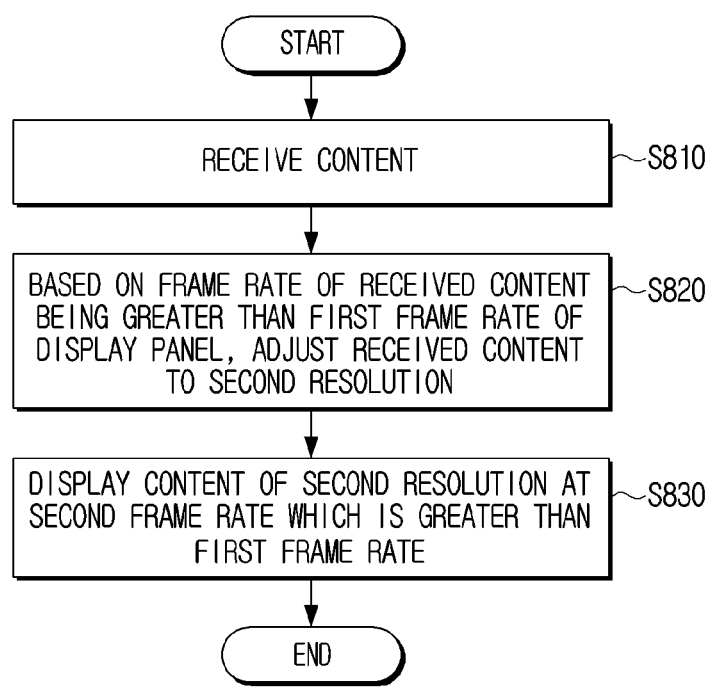
FIG. 8 is a flowchart illustrating an example method of controlling a display apparatus according to an embodiment of the disclosure.

FIG. 8 is a flowchart illustrating an example method of controlling a display apparatus according to an embodiment of the disclosure.

The content is received (S810). Based on the frame rate of the received content being greater than the first frame rate of the display panel, the received content is adjusted to the second resolution (S820). The content of the second resolution is displayed at the second frame rate, which is greater than the first frame rate (S830). The display panel may drive the frame of the first resolution at the first frame rate.

The display panel may include the plurality of gate lines and the plurality of data lines, and the each of the plurality of data lines may provide data to a pixel in the same column, and the displaying (S830) may include concurrently driving two adjacent gate lines of the plurality of gate lines.

The displaying (S830) may include repeatedly displaying the one pixel line included in the content of the second resolution through two adjacent gate lines of the plurality of gate lines.

The display panel may display one frame for a first time corresponding to the first frame rate, and the displaying (S830) may include displaying the one frame included in the content of the second resolution for a second time, which is less than a first time and corresponds to the second frame rate.

The adjusting (S820) may include adjusting the received content to the second resolution based on the equal value of the vertical resolution of the display panel.

The adjusting (S820) may include adjusting the horizontal resolution of the content based on the horizontal resolution of the display panel, and adjusting the vertical resolution of the content based on the equal value of the vertical resolution of the display panel.

Identifying the equal value of the vertical resolution of the display panel based on the frame rate and the first frame rate of the content may be further included.

The first frame rate may be a maximum frame rate which may be output by the display panel, and the vertical resolution of the display panel may be the number of pixels arranged in the vertical direction of the plurality of pixels included in the display panel.

The adjusting and displaying (S820, S830) may include, based on the content being a first type, adjusting the content to the second resolution and displaying at the second frame rate, and based on the content being a second type, not adjusting the resolution of the content and displaying at the first frame rate.

Based on the frame rate of the content being identical with the first frame rate, performing frame interpolation on the content to increase the frame rate of the content may be further included, and the adjusting (S820) may include adjusting the content to which the frame rate is increased to the second resolution.

The adjusting (S820) may include, based on a user command of increasing the frame rate being input, adjust the received content to the second resolution.

According to various embodiments as described above, the display apparatus may, by adjusting the resolution of the frame to reduce the time in which the frame is displayed, improve the response characteristic.

In addition, the display apparatus may be implemented at a low cost because the display apparatus is capable of being operated at a relatively low operating frequency compared to the frame rate of the content.

With contents being produced at high resolution, the image quality perceived by the user may not significantly deteriorate despite reducing the vertical resolution of the content by half, and with the response characteristic improved, a smoother image may be output.

According to an embodiment, the various embodiments described above may be implemented as a software including instructions stored on machine-readable storage media readable by a machine (e.g., computer). The machine, as an apparatus capable of calling an instruction stored in a storage medium and operating according to the called instruction, may include an electronic apparatus (e.g., electronic apparatus A) according to the disclosed embodiments. Based on instructions being executed by the processor, the processor may directly, or using other elements under the control of the processor, perform a function corresponding to the instruction. The instruction may include a code generated by a compiler or a code executable by an interpreter. The machine-readable storage medium may be provided in the form of a non-transitory storage medium. Herein, the 'non-transitory' a storage medium may not include a signal and is tangible, but does not distinguish data being semi-permanently or temporarily stored in a storage medium.

According to an embodiment, the method according to various embodiments disclosed herein may be provided in a computer program product. The computer program product may be exchanged between a seller and a purchaser as a commodity. The computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be at least temporarily stored in a storage medium such as a manufacturer's server, a server of an application store, or a memory of a relay server, or temporarily generated.

In addition, according to an embodiment, the various embodiments described above may be implemented in a computer or in a recording medium capable of reading with a similar apparatus using a software, a hardware or a combination of software and hardware. In some cases, the embodiments described herein may be implemented as a processor itself. Based on a software implementation, the embodiments according to the process and function described in the disclosure may be implemented as separate software modules. Each of the software modules may perform one or more function or operation described in the present disclosure.

The computer instructions for performing a processing operation of a device according to the various embodiments described above may be stored in a non-transitory computer-readable medium. The computer instructions stored in this non-transitory computer-readable medium may have, based on being executed by the processor of a specific device, may have a specific device perform a processing operation of other device according to the various embodiments described above. The non-transitory computer readable medium may refer, for example, to a medium that stores data semi-permanently, and is readable by an device. Examples of a non-transitory computer-readable medium may include a compact disc (CD), a digital versatile disc (DVD), a hard disc, a Blu-ray disc, a universal serial bus (USB), a memory card, a read only memory (ROM), and the like.

In addition, each of the elements (e.g., a module or a program) according to the various embodiments described above may include a single entity or a plurality of entities, and some sub-elements of the abovementioned sub-elements may be omitted, or another sub-element may be further included in various embodiments. Alternatively or additionally, some elements (e.g., modules or programs) may be integrated into one entity and perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operations.

While the disclosure has been illustrated and described with reference to various example embodiments, it will be understood that the various example embodiments are intended to be illustrative, not limiting. It will be further understood by those skilled in the art that various changes in form and details may be made therein without departing from the true spirit and full scope of the disclosure, including the appended claims and their equivalents.

What is claimed is:

1. A display apparatus, comprising:
a display panel configured to drive a frame of a first resolution at a first frame rate, the display panel comprising gate lines each connected to pixels in a row of the display panel and data lines each connected to pixels in a column of the display panel;
a communication interface comprising circuitry configured to receive content; and
a processor configured to:
identify a frame rate of the received content,
identify, based on additional information of the received content or image analysis of the received content, whether the received content is upscaled content upscaled from an original resolution to an upscaled resolution, and
based on the frame rate of the received content being greater than the first frame rate and the received content being identified as upscaled content, control the display panel to display the received content at a second resolution, lower than the first resolution, and at a second frame rate, greater than the first frame rate, by reducing a resolution of the received content to the second resolution,
wherein the processor is configured to control the display panel to display the content of the second resolution by concurrently driving two or more gate lines of the plurality of gate lines for displaying one pixel line in a frame of the content of the second resolution.

2. The display apparatus of claim 1, wherein the processor is configured to repeatedly display one pixel line of the content of the second resolution by driving two or more adjacent gate lines of the plurality of gate lines.

3. The display apparatus of claim 1, wherein the display panel is configured to display one frame for a first time period corresponding to the first frame rate, and
wherein the processor is configured to control the display panel to display one frame of content of the second resolution for a second time period, the second time period being less than the first time period and corresponding to the second frame rate.

4. The display apparatus of claim 1, wherein the processor is configured to adjust the received content to the second resolution based on an equal value of a vertical resolution of the display panel.

5. The display apparatus of claim 4, wherein the processor is configured to adjust a horizontal resolution of the received content based on a horizontal resolution of the display panel, and to adjust a vertical resolution of the received content based on the equal value of the vertical resolution of the display panel.

6. The display apparatus of claim 4, wherein the processor is configured to identify the equal value of the vertical resolution of the display panel based on a frame rate of the received content and the first frame rate.

7. The display apparatus of claim 4, wherein the first frame rate is a maximum frame rate which the display panel is capable of outputting, and
wherein the vertical resolution of the display panel is a number of pixels arranged in a vertical direction of a plurality of pixels of the display panel.

8. The display apparatus of claim 1, wherein the processor is configured to:
based on the received content being a first type, adjust resolution of the received content to the second resolution, and
based on the received content being a second type, control the display panel to display the received content at the first frame rate without adjusting resolution of the received content.

9. The display apparatus of claim 1, wherein the processor is configured to:
based on a frame rate of the received content being identical to the first frame rate, increase the frame rate of the received content by performing frame interpolation on the received content, and
reduce resolution of the frame-rate increased received content to the second resolution.

10. The display apparatus of claim 1, wherein the processor is configured to, based on receiving a command to increase a frame rate being input, reduce resolution of the received content to the second resolution.

11. A method of controlling a display panel configured to drive a frame of a first resolution at a first frame rate and comprising gate lines each connected to pixels in a row of the display panel and data lines each connected to pixels in a column of the display panel, the method comprising:
receiving content;
identify a frame rate of the received content;
identify, based on additional information of the received content or image analysis of the received content, whether the received content is upscaled content upscaled from an original resolution to an upscaled resolution, and
based on the frame rate of the received content being greater than the first frame rate and the received content being identified as upscaled content displaying the received content at a second resolution, lower than the first resolution, and at a second frame rate, greater than the first frame rate, by reducing a resolution of the received content to the second resolution,
wherein the displaying of the content of the second resolution comprises concurrently driving two or more gate lines of the plurality of gate lines for displaying one pixel line in a frame of the content of the second resolution.

12. The method of claim 11, wherein the displaying comprises repeatedly displaying one pixel line of a content of the second resolution by driving two or more adjacent gate lines of the plurality of gate lines.

13. The method of claim 11, wherein the display panel is configured to display a one frame for a first time period corresponding to the first frame rate, and
wherein the displaying comprises displaying one frame of content of the second resolution for a second time period, the second time period being less than the first time period and corresponding to the second frame rate.

14. The method of claim 11, wherein the adjusting comprises adjusting the received content to the second resolution based on an equal value of a vertical resolution of the display panel.

15. The method of claim 14, wherein the adjusting comprises adjusting a horizontal resolution of the received content based on a horizontal resolution of the display panel, and adjusting a vertical resolution of the received content based on the equal value of the vertical resolution of the display panel.

16. The method of claim 14, further comprising:
identifying the equal value of the vertical resolution of the display panel based on a frame rate of the received content and the first frame rate.

17. The method of claim 14, wherein the first frame rate is a maximum frame rate, which the display panel is capable of outputting, and wherein a vertical resolution of the display panel is a number of pixels arranged in a vertical direction of a plurality of pixels of the display panel.

18. The method of claim 11, further comprising:

based on the received content being a first type, adjusting resolution of the received content to the second resolution and displaying at the second frame rate, and based on the received being a second type, displaying the received content at the first frame rate without adjusting resolution of the received content.

\* \* \* \* \*